(12) United States Patent
Maeda et al.

(10) Patent No.: US 10,428,836 B2
(45) Date of Patent: Oct. 1, 2019

(54) ROTOR BALANCE ADJUSTMENT METHOD

(71) Applicant: MITSUBISHI HEAVY INDUSTRIES COMPRESSOR CORPORATION, Tokyo (JP)

(72) Inventors: Takaki Maeda, Hiroshima (JP); Shinichiro Tokuyama, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 44 days.

(21) Appl. No.: 15/765,397

(22) PCT Filed: Dec. 3, 2015

(86) PCT No.: PCT/JP2015/083993
§ 371 (c)(1),
(2) Date: Apr. 2, 2018

(87) PCT Pub. No.: WO2017/094161
PCT Pub. Date: Jun. 8, 2017

(65) Prior Publication Data
US 2018/0283402 A1 Oct. 4, 2018

(51) Int. Cl.
*F04D 29/66* (2006.01)
*F04D 29/28* (2006.01)
(Continued)

(52) U.S. Cl.
CPC ......... *F04D 29/662* (2013.01); *F04D 17/122* (2013.01); *F04D 29/286* (2013.01); *G01M 1/32* (2013.01)

(58) Field of Classification Search
CPC ............. F04D 29/662; Y10T 29/49325; Y10T 29/49327; Y10T 29/49329; Y10T 29/49012
See application file for complete search history.

(56) References Cited

U.S. PATENT DOCUMENTS

2012/0321465 A1* 12/2012 Guenard ................. F01D 5/066
416/124

FOREIGN PATENT DOCUMENTS

JP 2010-169124 A 8/2010
JP 2014-101837 A 6/2014

OTHER PUBLICATIONS

Written Opinion for corresponding International Application No. PCT/JP2015/083993, dated Mar. 1, 2016 (8 pages).
(Continued)

*Primary Examiner* — Jason L Vaughan
*Assistant Examiner* — Amanda Kreiling
(74) *Attorney, Agent, or Firm* — Osha Liang LLP (57) ABSTRACT

A rotor balance adjustment method includes: an impeller adjustment process of adjusting, with respect to each of the plurality of impellers, a balance of a position of the center of gravity of the impeller by separately adjusting a weight of the impeller before being attached to the rotor main body; a fixing process of fixing the plurality of impellers to the rotor main body after the impeller adjustment process is performed, wherein the plurality of impellers comprises a large-sized impeller that is larger and heavier than the other impellers; an inclination adjustment process of adjusting an inclination of the large-sized impeller with respect to the rotor main body after the fixing process is performed; and a rotor adjustment process of adjusting a balance of a position of the center of gravity of the rotor.

4 Claims, 5 Drawing Sheets

(51) Int. Cl.
*G01M 1/32* (2006.01)
*F04D 17/12* (2006.01)

(56) References Cited

OTHER PUBLICATIONS

International Search Report for corresponding International Application No. PCT/JP2015/083993, dated Mar. 1, 2016 (4 pages).

\* cited by examiner

ROTOR BALANCE ADJUSTMENT METHOD

TECHNICAL FIELD

The present invention relates to a rotor balance adjustment method.

BACKGROUND ART

In a rotary machine such as a centrifugal compressor having a rotor to which a plurality of impellers are fixed, the rotor rotates at a high speed, and thus, a desired output is generated. In the rotary machine, vibrations of the rotor during an operation thereof increase due to weight deviation or eccentricity of the rotor. In order to suppress the vibrations, a balance adjustment is performed on the rotor to which the impeller or the like is fixed so as to suppress unbalance of the rotor.

For example, PTL 1 describes a method of performing a balance adjustment in a state where a set of impellers is assembled on a rotary shaft which is a rotor of a centrifugal compressor. In this method, each time the set of impellers is attached, the balance of the rotary shaft is adjusted by cutting two different surfaces of the impeller orthogonal to the rotary shaft.

In addition, in PTL 2, by calculating and using an inclination amount of an impeller with respect to a rotary shaft, only one surface orthogonal to the rotary shaft is cut to adjust the balance of the rotary shaft. Accordingly, compared to the balance adjustment method described in PTL 1, in the balance adjustment method described in PTL 2, the number of surfaces to be processed is reduced, and thus, an operation time for the balance adjustment is shortened.

However, in a case where a plurality of impellers are attached, some impellers may become large-sized impellers with heavier weight than other impellers. In a case where some impellers are large-sized impellers, influences of the large-sized impellers on the rotor become larger than those of other impellers. That is, even when a position of the center of gravity and an inclination of the large-sized impeller are slightly changed, there is a possibility that the balance of the rotor is greatly collapsed.

CITATION LIST

Patent Literature

[PTL 1] Japanese Unexamined Patent Application, First Publication No. 2010-169124

[PTL 2] Japanese Unexamined Patent Application, First Publication No. 2014-101837

In a case where a large-sized impeller is attached and a balance of a rotor is adjusted, unbalance by the large-sized impeller is dominant in the same way as a case where a plurality of impellers having only small weight difference are attached, and thus, even if there is no problem in a balance test, vibrations are likely to increase during an actual operation. Accordingly, it is required to adjust the balance of the rotor with higher accuracy.

SUMMARY OF INVENTION

One or more embodiments of the present invention provide a rotor balance adjustment method capable of adjusting the balance of the rotor with high accuracy even in a case where the large-sized impeller is used.

According to a first aspect of one or more embodiments of the present invention, there is provided a rotor balance adjustment method in which a rotor includes a rotor main body extending in an axial direction and a plurality of impellers fixed to the rotor main body, the method includes: an impeller adjustment process of adjusting a balance of a position of the center of gravity of the impeller as one body by separately adjusting weight with respect to each of the plurality of impellers before being attached to the rotor main body; a fixing process of fixing the plurality of impeller to the rotor main body after the impeller adjustment process is performed; an inclination adjustment process of adjusting an inclination of a large-sized impeller with respect to the rotor main body after the fixing process is performed, the large-sized impeller being an impeller having large weight among the plurality of impellers fixed to the rotor main body; and a rotor adjustment process of adjusting a balance of a position of the center of gravity of the rotor by adjusting weight of impellers other than the large-sized impeller among the plurality of impellers after the inclination adjustment process is performed.

According to one or more embodiments of this configuration, it is possible to adjust the position of the center of gravity of the rotor by performing the balance adjustment on the impellers other than the large-sized impeller after adjusting the inclination of the large-sized impeller with respect to the rotor main body. Accordingly, it is possible to adjust the position of the center of gravity of the rotor without changing the weight of the large-sized impeller. That is, it is possible to adjust the position of the center of gravity of the rotor without handling the large-sized impeller after subjected to the weight adjustment once. Accordingly, it is possible to prevent the position of the center of gravity of the large-sized impeller itself from being deviated after the position of the center of gravity of the rotor is adjusted, and it is possible to prevent the large-sized impeller from being inclined to the rotor main body.

In the rotor balance adjustment method according to a second aspect of one or more embodiments of the present invention, in the first aspect, the rotor adjustment process may be performed by applying processing to a surface which is toward one side of a first impeller, which is the impeller other than the large-sized impeller, in the axial direction and a surface which is toward the other side of a second impeller, which is different from the first impeller, in the axial direction.

In the rotor balance adjustment method according to a third aspect of one or more embodiments of the present invention, in the first aspect or second aspect, the rotor balance adjustment method may further include an intermediate rotor adjustment process of adjusting the balance of the position of the center of gravity of the rotor by adjusting weight with respect to the two impellers. The fixing process may include a first fixing process of fixing two impellers to the rotor main body, and a second fixing process of fixing the large-sized impeller to the rotor main body after the first fixing process is performed. The intermediate rotor adjustment process may be performed before the second fixing process is performed and after the first fixing process is performed.

According to one or more embodiments of this configuration, it is possible to eliminate the deviation of the position of the center of gravity of the rotor once before the large-sized impeller is attached. Accordingly, when the large-sized impeller is attached to the rotor main body, the influences of impellers other than the large-sized impeller are suppressed. Therefore, it is possible to perform the balance adjustment on the rotor such that the influences caused by the large-sized impeller are effectively eliminated.

In the rotor balance adjustment method according to a fourth aspect of one or more embodiments of the present invention, in any one of the first to third aspects, in the second fixing process, another impeller may be fixed to a side opposite in the axial direction to a position at which the large-sized impeller is fixed such that the two impellers are interposed therebetween.

According to the rotor balance adjustment method according to one or more embodiments of the present invention, it is possible to adjust the balance of the rotor with high accuracy even in a case where the large-sized impeller is used.

DESCRIPTION OF EMBODIMENTS

Hereinafter, embodiments according to the present invention will be described with reference to FIGS. 1 to 5.

Figure 1:
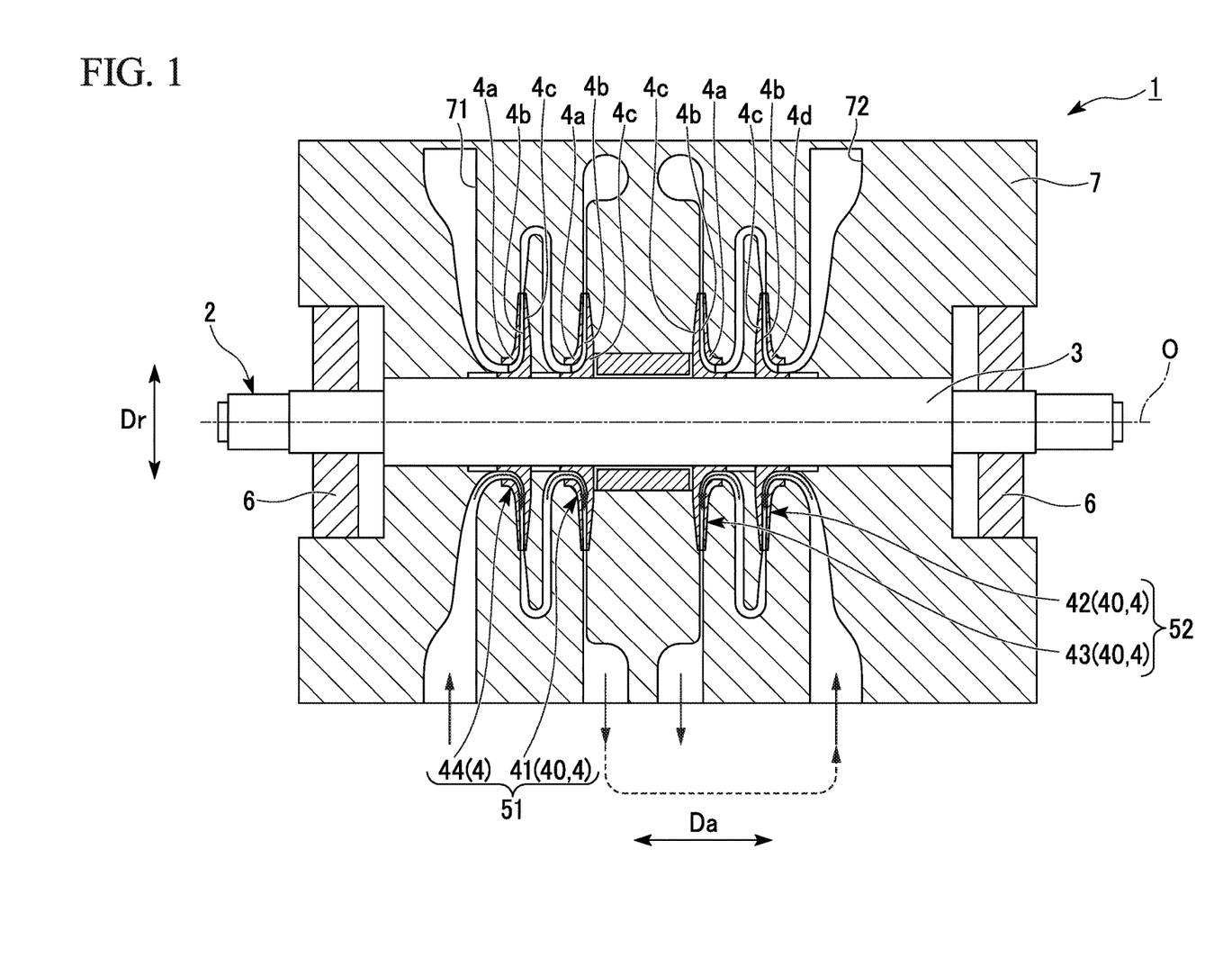
FIG. 1 is a sectional view showing a centrifugal compressor including a rotor which is adjusted by a rotor balance adjustment method of one or more embodiments of the present invention.

In one or more embodiments, a rotary machine having a rotor 2 adjusted by a rotor balance adjustment method S1 is a multi-stage centrifugal compressor 1 having a plurality of impeller 4. The centrifugal compressor 1 compressed a working fluid. As shown in FIG. 1, the centrifugal compressor 1 includes the rotor 2, bearings 6, and a casing 7.

The rotor 2 is rotatable with respect to the casing 7. The rotor 2 includes a rotor main body 3 and the plurality of impellers 4.

The rotor main body 3 is supported by bearings 6 to be around an axis O rotatable with respect to the casing 7. The rotor main body 3 is formed in a columnar shape around the axis O. The rotor main body 3 extends in an axial direction Da which is an extension direction of the axis O.

The impellers 4 are attached and fixed to the rotor main body 3. The impellers 4 compress a process gas (working fluid) using a centrifugal force generated by a rotation of the rotor main body 3. Each impeller 4 of one or more embodiments includes a disk 4a, a blade 4b, and a cover 4c. That is, the impeller 4 of one or more embodiments is a so-called closed type impeller.

The disk 4a is formed in a disk shape of which a diameter gradually increases toward the outside of the axis O in a radial direction Dr in the axial direction Da of the rotor main body 3.

The blade 4b is formed to protrude in the axial direction Da from the disk 4a. A plurality of blades 4b are formed at predetermined intervals in a circumferential direction of the axis O.

The cover 4c covers the plurality of blades 4b from a side opposite to the side on which the disk 4a is disposed in the axial direction Da. The cover 4c is formed in a disk shape facing the disk 4a. The cover 4c defines a flow path through which the process gas flows by a surface facing the disk 4a and the blade 4b.

The plurality of impellers 4 are attached to the rotor main body 3 between the bearings 6 disposed on both sides of the axial direction Da. The impellers 4 configure two sets of impeller groups in which the directions of the blades 4b face sides opposite to each other in the axial direction Da. Specifically, in the centrifugal compressor 1 of one or more embodiments, a first impeller group S1 is disposed on one side (a first side and a left side on a paper surface of FIG. 1) which is one end portion side of the rotor main body 3 in the axial direction Da. In the centrifugal compressor 1 of one or more embodiments, a second impeller group 52 is disposed on the other side (a second side and a right side on the paper surface of FIG. 1) which is an end portion side positioned on a side opposite to the one side of the rotor main body 3 in the axial direction Da. In the first impeller group 51, the cover 4c of each impeller 4 is disposed on the one side in the axial direction Da with respect to the disk 4a. Conversely, in the second impeller group 52, the cover 4c of each impeller 4 is disposed on the other side in the axial direction Da with respect to the disk 4a.

In the first impeller group 51 and the second impeller group 52, a pressure of the process gas gradually increases toward a center position in the axial direction Da between the first impeller group 51 and the second impeller group 52. That is, the process gas flows while being compressed toward the center position in the axial direction Da between the first impeller group 51 and the second impeller group 52 in stages.

In one or more embodiments, the plurality of impellers 4 are configured of a plurality of standard impellers 40 and a one large-sized impeller 44. The standard impellers 40 are most frequently disposed among a plurality of impellers 4. The large-sized impeller 44 of one or more embodiments is formed to be longer in the axial direction Da than each of the standard impellers 40. Accordingly, the large-sized impeller 44 can cause more process gas to flow than the standard impellers 40. The large-sized impeller 44 has a larger weight than that of the standard impeller 40. In one or more embodiments, among the plurality of impellers attached to the rotor main body 3, the large-sized impeller 44 has the largest weight. In one or more embodiments, among the plurality of impellers 4, the large-sized impeller 44 is disposed on the most one side in the axial direction Da. That is, the large-sized impeller 44 configures a portion of the first impeller group 51.

Here, the plurality of impellers 4 of the first impeller group 51 in the FIG. 1 are referred to as the large-sized impeller 44 and a first impeller 41 in order from the one side in the axial direction Da. Similarly, the plurality of impellers 4 of the second impeller group 52 in FIG. 1 are referred to as a second impeller 42 and a third impeller 43 in order from the other side of the axial direction Da. The first impeller 41 to the third impeller 43 are the standard impellers 40.

The bearings 6 rotatably support the rotor main body 3 around the axis O. Each of the bearings 6 is provided on each of both end portions of the rotor main body 3. Each of the bearings 6 is attached to the casing 7.

The casing 7 supports the bearings 6 and covers the rotor 2 from an outer peripheral side. The casing 7 is formed in a cylindrical shape. The casing 7 includes a suction port 71 into which the process gas flows and a discharge port 72 from which the process gas flows out.

A rotating force is transmitted to the rotor main body 3 to the centrifugal compressor 1 from the outside. Accordingly, the impellers 4 fixed to the rotor main body 3 rotate. The process gas flows in from the suction port 71, is compressed by the rotating impellers 4, and is discharged from the discharge port 72. In the centrifugal compressor 1, the rotor 2 including the rotor main body 3 and the impellers 4 rotates at a high speed. Here, if the position of the center of gravity of the rotor 2 is deviated from the axis O and is eccentric, vibrations of the rotor 2 are likely to increase during a high speed rotation. Accordingly, when the rotor 2 is assembled, a balance adjustment is performed such that the rotor 2 is not eccentric. Hereafter, a rotor balance adjustment method S1 of one or more embodiments will be described with reference to FIG. 2.

Figure 2:
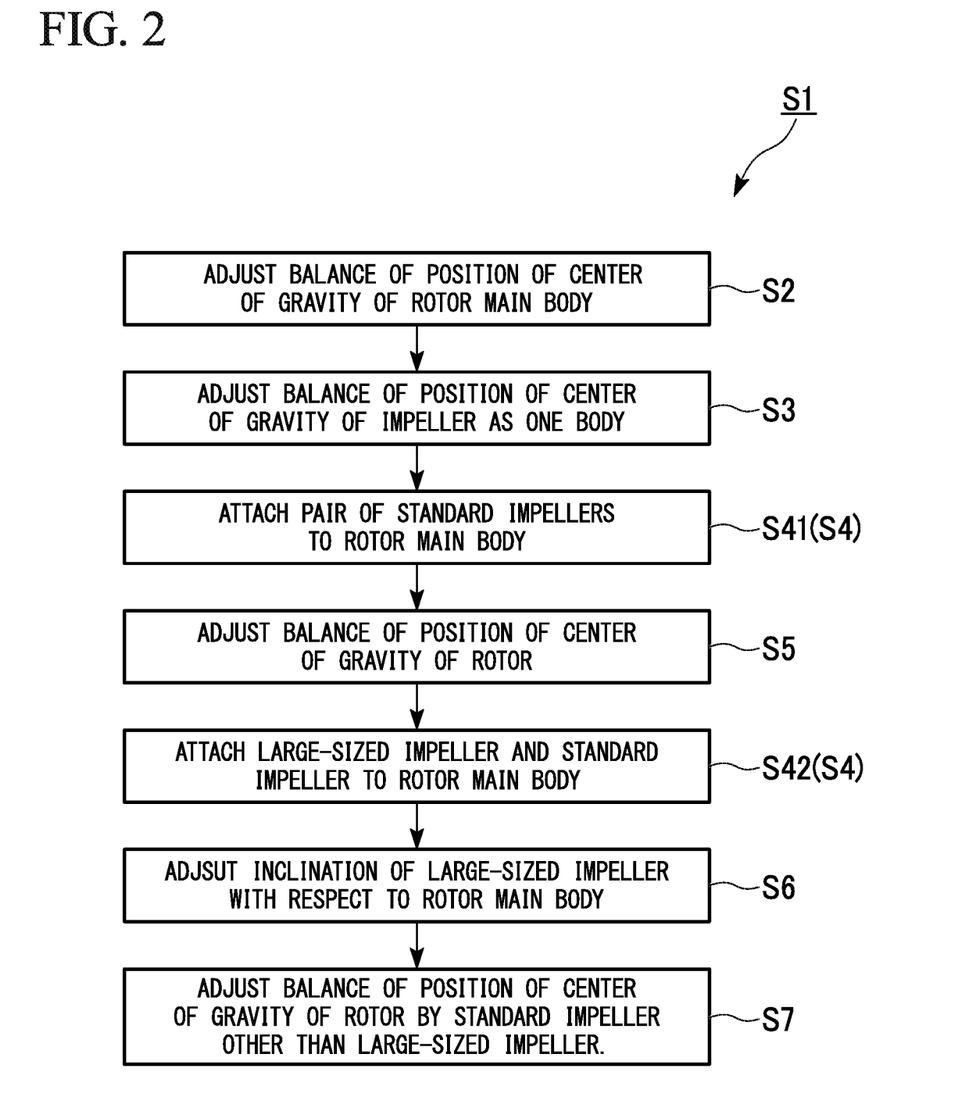
FIG. 2 is a flow diagram showing the rotor balance adjustment method of one or more embodiments of the present invention.

In the rotor balance adjustment method S1, first, a balance adjustment is performed on the position of the center of gravity of the rotor main body 3 before the impellers 4 are assembled to the rotor main body 3 (rotor main body balance adjustment process S2). Specifically, the positions of the centers of gravity of the rotor main body 3 in the axial direction Da and the radial direction Dr are adjusted when the rotor main body 3 rotates. For example, in the balance adjustment, the position of the center of gravity of an adjustment target is measured in a state where the adjustment target is attached to a balancer and is rotated. In the rotor main body balance adjustment process S2, the rotor main body 3 which is the adjustment target is rotated around the axis O, the position of the center of gravity of the rotor main body 3 is measured, and thus, the position of the center of gravity of the rotor main body 3 is adjusted.

Thereafter, a balance adjustment is performed on each of the plurality of impellers 4 before the plurality of impellers 4 are attached to the rotor main body 3 (impeller adjustment process S3). Specifically, a weight adjustment is separately performed on each of the plurality of impeller 4. Accordingly, a balance adjustment is performed on the position of the center of gravity of the impeller 4 alone when the impeller 4 rotates. In the impeller adjustment process S3, the impeller 4 which is the adjustment target is rotated and the position of the center of gravity of the impeller 4 is measured. In a case where the position of the center of gravity is deviated, processing such as cutting is performed on at least one of a surface (on the side on which the blade 4b is not disposed) outside the disk 4a and a surface (on the side on which the blade 4b is not disposed) outside the cover 4c. Accordingly, in the impeller adjustment process S3, the position of the center of gravity of the impeller 4 itself is adjusted.

After the impeller adjustment process S3 is performed, the plurality of impellers 4 are fixed to the rotor main body 3 (fixing process S4). In the fixing process S4, the plurality of impellers 4 are attached to rotor 2 so as to form a pair in two. Specifically, among the plurality of impellers 4, a first set including the first impeller 41 and the third impeller 43 and a second set including the large-sized impeller 44 and the second impeller 42 as pairs of right and left impellers in order from the center of the rotor main body 3 in the axial direction Da are attached to the rotor main body 3 in order so as to form a pair in two. The fixing process S4 of the present embodiment includes a first fixing process S41 and a second fixing process S42.

Figure 3:
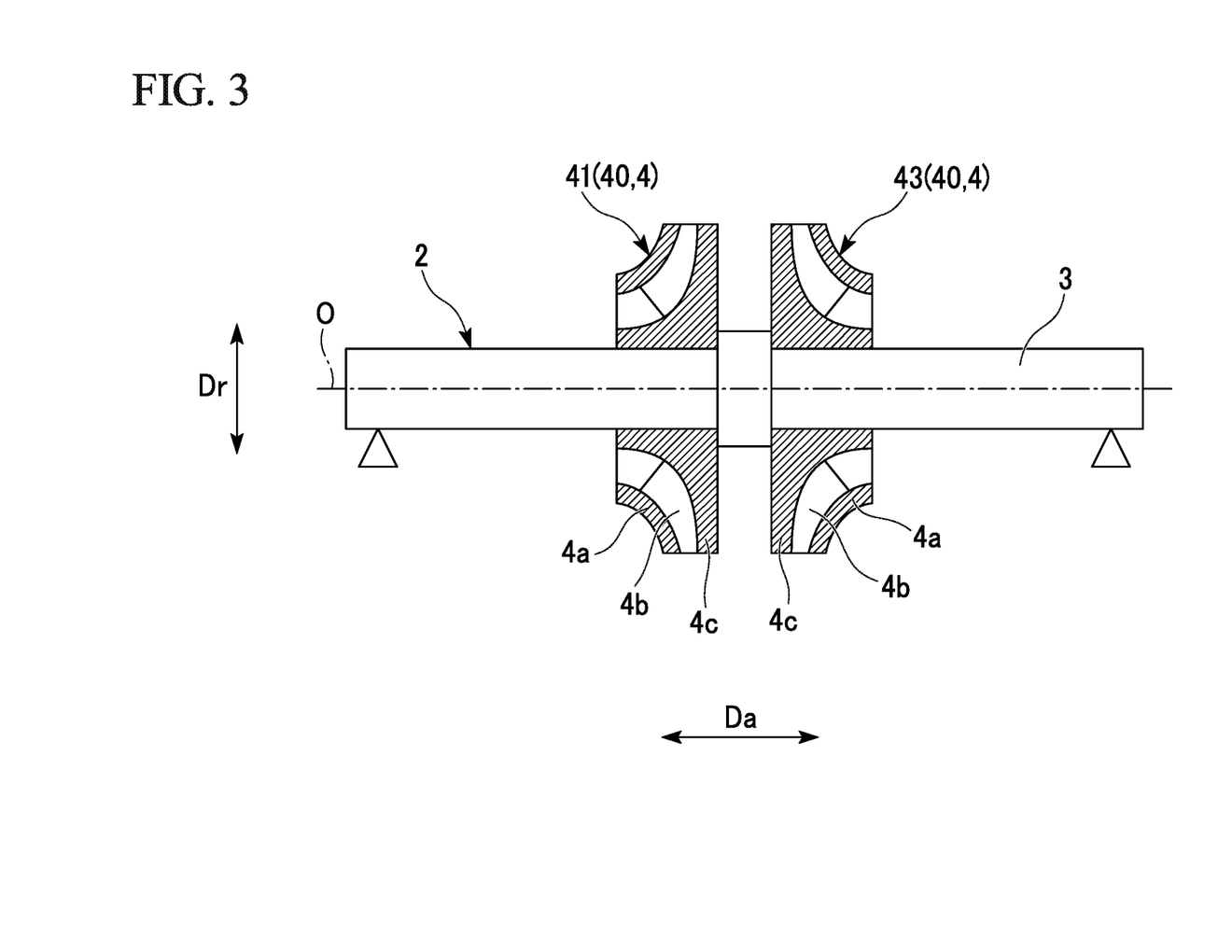
FIG. 3 is a schematic view explaining the rotor to which two standard impellers are fixed in one or more embodiments of the present invention.

In the first fixing process S41, two standard impellers 40 are fixed to the vicinity of center of the rotor main body 3 in the axial direction Da. In the first fixing process S41, as shown in FIG. 3, the pair of standard impellers 40 is fixed to the rotor main body 3 in a state where the disks 4a face the sides opposite to each other so as to face in the axial direction Da. In the first fixing process S41 of one or more embodiments, the first impeller 41 and the third impeller 43 which are the first set are attached to the rotor main body 3 such that the covers 4c face the sides opposite to each other in the axial direction Da.

Figure 4:
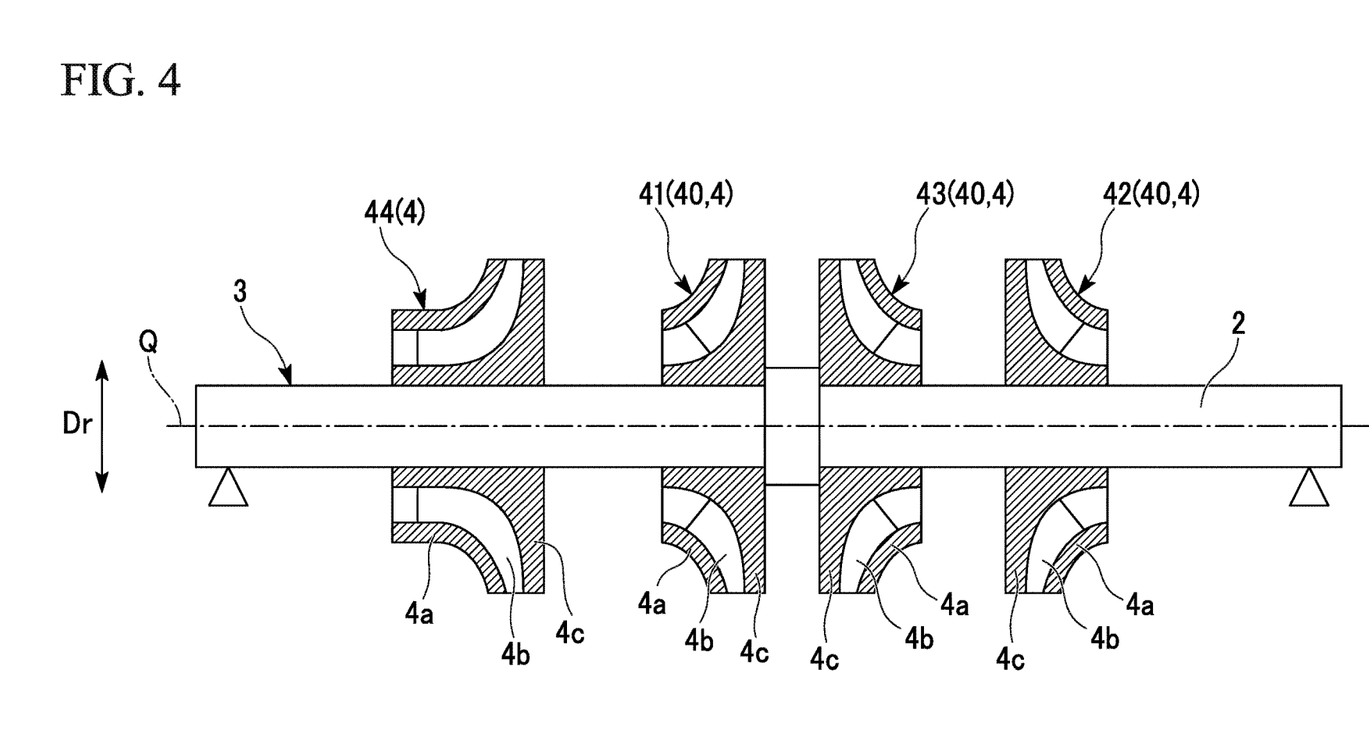
FIG. 4 is a schematic view explaining the rotor to which a large-sized impeller is fixed in one or more embodiments of the present invention.

As shown in FIG. 2, the second fixing process S42 is performed after the first fixing process S41 is performed. In the second fixing process S42, the large-sized impeller 44 is fixed to the rotor main body 3. In the second fixing process S42 of one or more embodiments, the large-sized impeller 44 and the standard impeller 40 are attached to the rotor main body 3 such that the standard impellers 40 fixed to the rotor main body 3 in the first fixing process S41 are interposed therebetween. That is, in the second fixing process S42, the second impeller 42 which is another standard impeller 40 is fixed to a side opposite in the axial direction Da to a position at which the large-sized impeller 44 is fixed such that the first impeller 41 and the third impeller 43 are interposed therebetween. In the second fixing process S42 of one or more embodiments, as shown in FIG. 4, the large-sized impeller 44 and the second impeller 42 which are the second set are attached to the rotor main body 3 such that the covers 4c face the sides opposite to each other in the axial direction Da.

As shown in FIG. 2, before the second fixing process S42 is performed and after the first fixing process S41 is performed, a balance adjustment is performed on the position of the center of gravity of the rotor main body 3 to which the two standard impellers 40 are attached (intermediate rotor adjustment process S5). As shown in FIG. 3, in the intermediate rotor adjustment process S5, the balance adjustment is performed on the rotor 2 in a state where the two standard impellers 40 are fixed to the rotor 2. In the intermediate rotor adjustment process S5, the balance adjustment of the position of the center of gravity of the rotor 2 when rotating is performed by adjusting the weight with respect to the two standard impellers 40. In the intermediate rotor adjustment process S5 of one or more embodiments, the position of the center of gravity of the rotor main body 3 is measured by rotating the rotor main body 3 to which the first impeller 41 and the third impeller 43 are fixed around the axis O. In a case where the position of the center of gravity of the rotor main body 3 is deviated, for example, processing such as cutting is performed on at least one of a surface outside the disk 4a of the first impeller 41 and the outside of the disk 4a of the third impeller 43. Accordingly, in the intermediate rotor adjustment process S5, the position of the center of gravity of the rotor 2 including the first impeller 41 and the third impeller 43 is adjusted.

In addition, in the impeller adjustment process S3, in a case where the surface outside the disk 4a of the first impeller 41 and the surface outside the disk 4a of the third impeller 43 are cut in advance, a surface outside the cover 4c of the first impeller 41 and surface outside the cover 4c of the third impeller 43 may be cut. That is, the surface to be processed can be appropriately changed.

Figure 5:
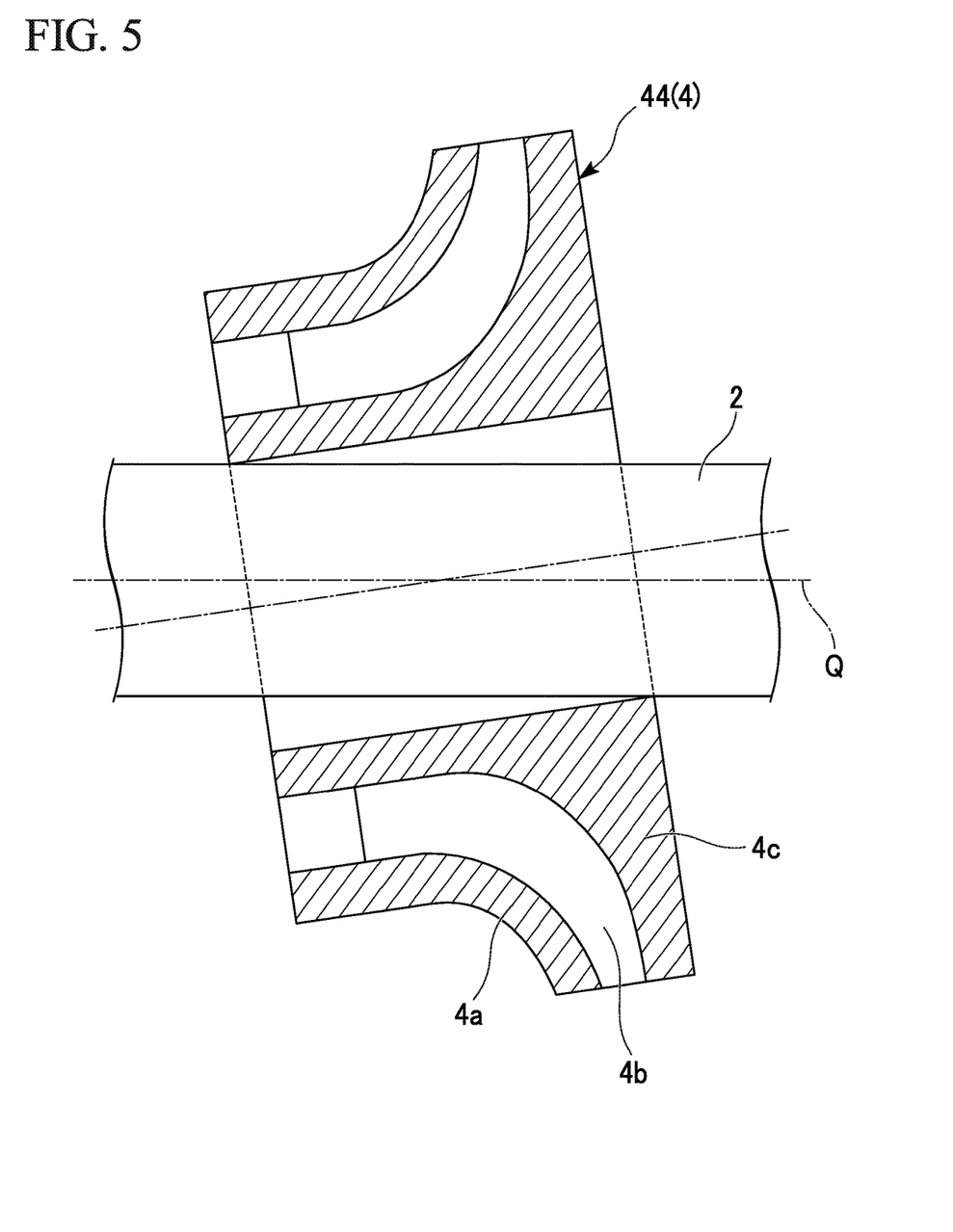
FIG. 5 is a schematic view explaining an inclination adjustment process in one or more embodiments of the present invention.

As shown in FIG. 2, after the second fixing process S42 which is the fixing process S4 is performed, an inclination of the large-sized impeller 44 among the plurality of impellers 4 fixed to the rotor main body 3 with respect to the rotor main body 3 is adjusted (inclination adjustment process S6). As shown in FIG. 5, in the inclination adjustment process S6, an inclination amount of the large-sized impeller 44 in a stationary state with respect to the rotor main body 3 is calculated. That is, in the inclination adjustment process S6, a moment balance of the large-sized impeller 44 with respect to the rotor main body 3 is adjusted. In the inclination adjustment process S6, the cover 4c and the disk 4a of the large-sized impeller 44 are cut to adjust the weight such that the calculated inclination amount decreases. Specifically, processing such as cutting is performed on at least one of one surface of the cover 4c in the axial direction Da which is a side of the cover 4c on which the blade 4b is not disposed and the other surface of the disk 4a in the axial direction Da which is a side of the cover 4c on which the blade 4b is not disposed. Accordingly, in the inclination adjustment process S6, the inclination amount of the large-sized impeller 44 with respect to the rotor main body 3 is adjusted.

As shown in FIG. 4, after the inclination adjustment process S6 is performed, the balance adjustment is performed on the position of the center of gravity of the rotor 2 with respect to the rotor main body 3 to which all the impellers 4 are attached (rotor adjustment process S7). That is, in the rotor adjustment process S7, the balance adjustment is performed on the rotor 2 to which the three standard impellers 40 and one large-sized impeller 44 are fixed. In the rotor adjustment process S7, the balance adjustment of the position of the center of gravity of the rotor 2 is performed by adjusting the weight of the standard impellers 40 other than the large-sized impeller 44 among the plurality of impellers 4. In the rotor adjustment process S7 of one or more embodiments, the position of the center of gravity of the rotor main body 3 is measured by rotating the rotor main body 3 around the axis O. In a case where the position of the center of gravity of the rotor main body 3 is deviated, for example, in the rotor adjustment process S7, processing such as cutting is performed on at least one of the surface which is toward the one side of the first impeller 41 which is the impeller 4 other than the large-sized impeller 44 in the axial direction Da and the surface which is toward the other side of the second impeller 42 different from the first impeller 41 in the axial direction Da. That is, for example, in the rotor adjustment process S7, the surface of the cover 4c of the first impeller 41 and the surface of the disk 4a of the second impeller 42 are cut. Accordingly, in the rotor adjustment process S7, the position of the center of gravity of the rotor 2 including all the impellers 4 is adjusted.

In addition, in the rotor adjustment process S7, the weight of the standard impellers 40 other than the large-sized impeller 44 may be adjusted. Accordingly, the present invention is not limited to the embodiments in which the surface of the cover 4c of the first impeller 41 and the surface of the disk 4a of the second impeller 42 are cut. For example, the disk 4a or the cover 4c of the third impeller 43 may be cut, and the disk 4a of the first impeller 41 or the cover 4c of the second impeller 42 may be cut.

In this way, the rotor 2 subjected to the rotor balance adjustment method S1 is disposed in the casing 7, and thus, the centrifugal compressor 1 is manufactured.

According to the above-described rotor balance adjustment method S1, when the rotor adjustment process S7 is performed after the inclination adjustment process S6 is performed, the balance adjustment is performed on the rotor 2 by cutting the standard impellers 40 other than the large-sized impeller 44. That is, without cutting the large-sized impeller 44 after the inclination of the large-sized impeller 44 with respect to the rotor main body 3 is adjusted by cutting the large-sized impeller 44, the position of the center of gravity of the rotor 2 is adjusted by cutting the first impeller 41 and the second impeller 42 to adjust the weight thereof. Accordingly, it is possible to adjust the position of the center of gravity of the rotor 2 without changing the weight of the large-sized impeller 44. That is, it is possible to adjust the position of the center of gravity of the rotor 2 without handling the large-sized impeller 44 after subjected to the weight adjustment by once processing. Accordingly, it is possible to prevent the position of the center of gravity of the large-sized impeller 44 itself from being deviated after the position of the center of gravity of the rotor 2 is adjusted, and it is possible to prevent the large-sized impeller 44 from being inclined to the rotor main body 3. Accordingly, it is possible to perform the balance adjustment of the rotor 2 with high accuracy even in a case where the large-sized impeller 44 is used.

In addition, the intermediate rotor adjustment process S5 is performed before the second fixing process S42 is performed. Accordingly, it is possible to eliminate the deviation of the position of the center of gravity of the rotor 2 once before the large-sized impeller 44 is attached. Accordingly, the large-sized impeller 44 can be attached to the rotor main body 3 in a state where the position of the center of gravity of the rotor 2 is not deviated. Therefore, it is possible to easily ascertain influences on the rotor 2 caused by attaching the large-sized impeller 44 to the rotor main body 3. Accordingly, it is possible to perform the balance adjustment on the rotor 2 such that the influences caused by the large-sized impeller 44 are effectively eliminated.

In addition, it is possible to perform the balance adjustment on each of all the standard impellers 40 and the large-sized impeller 44 before being attached to the rotor main body 3 by the impeller adjustment process S3. Therefore, it is possible to assemble the plurality of impeller 4 to the rotor main body 3 in a state where the balance adjustment is realized. Accordingly, it is possible to reliably remove the eccentricity of the rotor 2 and it is possible to prevent occurrence of vibrations when the rotor 2 is assembled to the centrifugal compressor 1 and the centrifugal compressor 1 rotates.

Hereinbefore, various embodiments of the present invention are described with reference to the drawings. However, the configurations of the embodiments and a combination thereof are only examples, and addition, omission, replacement, and other modifications may be applied within a scope which does not depart from the gist of the present invention. In addition, the present invention is not limited by the embodiments and is limited by only claims.

In addition, in one or more embodiments, as the plurality of impellers 4, one large-sized impeller 44 and three standard impellers 40 are attached to the rotor main body 3. However, the present invention is not limited to this. For example, two or more large-sized impellers 44 may be attached to the rotor main body 3 or four or more standard impellers 40 may be attached to the rotor main body 3. In addition, unlike the described embodiments, the number of the plurality of impellers 4 is not limited to an even number and may be an odd number.

In addition, in the above embodiments, the centrifugal compressor is described as an example of the rotary machine. However, the present invention is not limited to this. For example, the rotary machine may be a turbocharger or a pump to which the adjustment method of the rotor of one or more embodiments is applied.

According to the rotor balance adjustment method S1 of one or more embodiments, it is possible to perform the balance adjustment of the rotor 2 with high accuracy even in a case where the large-sized impeller 44 is used.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: centrifugal compressor
O: axis
Da: axial direction
Dr: radial direction
2: rotor
3: rotor main body
4: impeller
4a: disk
4b: blade
4c: cover
40: standard impeller
41: first impeller
42: second impeller
43: third impeller
44: large-sized impeller
51: first impeller group
52: second impeller group
6: bearing
7: casing
71: suction port
72: discharge port
S1: rotor balance adjustment method
S2: rotor main body balance adjustment process
S3: impeller adjustment process
S4: fixing process
S41: first fixing process
S42: second fixing process
S5: intermediate rotor adjustment process
S6: inclination adjustment process
S7: rotor adjustment process

The invention claimed is:

1. A rotor balance adjustment method of a rotor that includes a rotor main body extending in an axial direction and a plurality of impellers fixed to the rotor main body, the method comprising:
an impeller adjustment process of adjusting, with respect to each of the plurality of impellers, a balance of a position of the center of gravity of the impeller by separately adjusting a weight of the impeller before being attached to the rotor main body;
a fixing process of fixing the plurality of impellers to the rotor main body after the impeller adjustment process is performed, wherein the plurality of impellers comprises a large-sized impeller that is larger and heavier than the other impellers;
an inclination adjustment process of adjusting an inclination of the large-sized impeller with respect to the rotor main body after the fixing process is performed; and
a rotor adjustment process of adjusting a balance of a position of the center of gravity of the rotor by adjusting a weight of the impellers other than the large-sized impeller after the inclination adjustment process is performed.

2. The rotor balance adjustment method according to claim 1,
wherein the plurality of impellers further comprises a first impeller and a second impeller, and
wherein the rotor adjustment process is performed by applying processing to a surface that is toward one side of the first impeller in the axial direction and a surface that is toward the other side of the second impeller in the axial direction.

3. The rotor balance adjustment method according to claim 1, wherein the plurality of impellers further comprises a first impeller and a second impeller, and wherein the method further comprises:
an intermediate rotor adjustment process of adjusting the balance of the position of the center of gravity of the rotor by adjusting a weight of the first and the second impellers,
wherein the fixing process includes:
a first fixing process of fixing the first and the second impellers to the rotor main body, and
a second fixing process of fixing the large-sized impeller to the rotor main body after the first fixing process is performed,
wherein the intermediate rotor adjustment process is performed before the second fixing process is performed and after the first fixing process is performed.

4. The rotor balance adjustment method according to claim 3,
wherein in the second fixing process, another impeller among the plurality of impellers is fixed to face a direction opposite the axial direction to a position at which the large-sized impeller is fixed such that the first and the second impellers are interposed therebetween.

* * * * *